Sept. 9, 1958     R. C. LADRICK     2,851,659
ELECTRICAL PROBES

Filed May 12, 1954

INVENTOR:
R. C. LADRICK
BY
C. B. Hamilton
ATTORNEY

United States Patent Office 2,851,659
Patented Sept. 9, 1958

2,851,659
ELECTRICAL PROBES

Ray C. Ladrick, Duluth, Minn., assignor to Western Electric Company, Incorporated, New York, N. Y., a corporation of New York Application May 12, 1954, Serial No. 429,241

1 Claim. (Cl. 324—72.5)

This invention relates to electrical probes, and more particularly to probes for indicating hot and grounded conductors.

In the tracing of circuits, probes connected either to ground or battery often are used to locate grounded or hot components of a circuit. Such probes in the past have no indicators carried therewith, and the lamps used therewith have been time consuming in replacement when they burn out.

An object of the invention is to provide new and improved electrical probes.

Another object of the invention is to provide electrical probes carrying lamps therewith which may be quickly replaced.

A further object of the invention is to provide electrical probes in which a handle portion is composed of two tubular sockets for receiving indicating lamps which may be replaced merely by pushing a new lamp into one end of the sockets.

An electrical probe illustrating certain features of the invention may include a pair of insulated tubes, secured together by insulating material to form a handle portion and mounting a probe on one end thereof out of alignment with the passages through the tubes, which carry connector elements and permit elongated lamps to be pushed thereinto and out therefrom.

Figure 1:
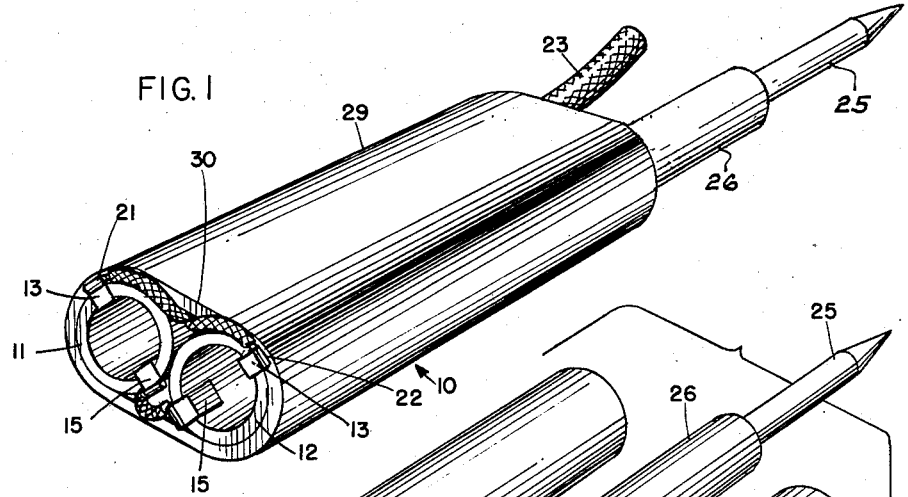
Figure 2:
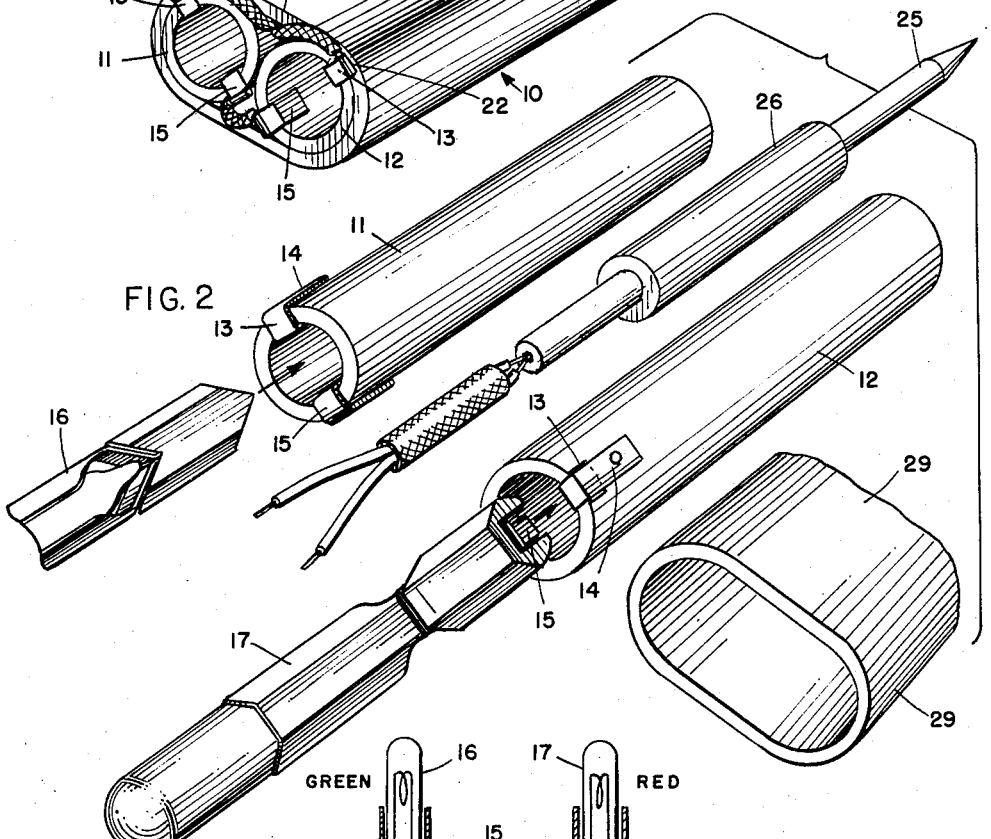
Figure 3:
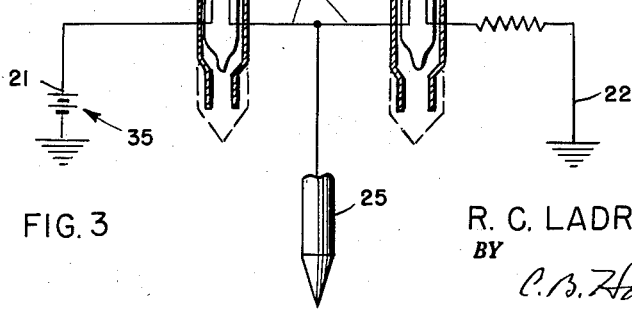

A complete understanding of the invention may be obtained from the following detailed description of a probe forming a specific embodiment thereof, when read in conjunction with the appended drawings, in which:

Fig. 1 is a perspective view of a probe forming one embodiment of the invention, Fig. 2 is an exploded view of the probe shown in Fig. 1, and Fig. 3 is a wiring diagram of the probe shown in Fig. 1.

Referring now in detail to the drawings, there is shown therein a probe 10 which includes a pair of insulating tubes 11 and 12 provided with notches 13 for receiving spring contacts 14 and 15. The contacts 14 and 15 are secured to the tubes and make contact with elongated lamps 16 and 17 which may be of the type used for switchboards; the lamp 16 being green and the lamp 17 being red. The two contacts 15 are soldered together and leads 21 and 22 forming a cord 23 are soldered to the contacts 14. The tubes 11 and 12 are assembled together with a conductive probe 25, which is electrically connected to the contacts 15, and a sleeve 26 of insulating material is secured on the probe 25. A binding sleeve 29 is slid over the assemblage of the two tubes 11 and 12 with the shank of the probe 25 on one side of the tubes and the cord 23 on the other. A layer of insulating material 30 composed of tape or molded material is formed over the assemblage to lock them all together and provide a handle portion for the probe.

The lead 21 is connected to a battery 35 grounded at one terminal thereof, and the lead 22 is connected to ground. Thus, when the probe 25 is brought into engagement with a hot wire, the red lamp 17 burns brighter to indicate that the wire contacted by the probe 25 is hot. If the element being contacted by the probe 25 is at ground potential, the red lamp 17 is shorted out and the green lamp 16 burns brighter to indicate that condition of the element contacted by the probe.

The ends of the lamps 16 and 17 are clearly visible as the probe 10 is held by an operator without the operator turning his head from the part being contacted by the probe 25. Also, the lamps 16 and 17 may be replaced merely by pushing a new lamp into the tube 11 or 12, whichever lamp is to be replaced, with the burned out lamp 16 or 17 dropping out the far end of the tube 11 or the tube 12.

The above-described probe is simple, compact and effective and may be easily handled and maintained.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

A probe, which comprises a pair of tubes composed of insulating material forming a handle, a first pair of spring contacts mounted in one of the tubes to form a socket therewith, a second pair of spring contacts mounted in the other tube to form a socket therewith, a pair of switchboard lamps slidable through the tubes and positioned in engagement with the pairs of spring contacts, a conductive probe mechanically secured to one side of the tubes out of alignment with the passages therethrough, means connecting the probe electrically to one contact of each pair of the spring contacts, an electrical cord having a grounded conductor and a second conductor at a potential different from the grounded conductor, means for connecting the grounded conductor to the other contact of the first pair of spring contacts and the second conductor to the other contact of the second pair of spring contacts, and means for securing the cord mechanically to the tubes at the side thereof opposite to that to which the probe is secured.

References Cited in the file of this patent

UNITED STATES PATENTS

| | | |
|---|---|---|
| 1,905,843 | Foulke | Apr. 25, 1933 |
| 2,517,032 | Rogers | Aug. 1, 1950 |
| 2,540,402 | Mosier | Feb. 6, 1951 |